B. G. FAUST.
HEN'S NEST.
APPLICATION FILED JULY 21, 1919.

1,329,963.

Patented Feb. 3, 1920.

Witness

Inventor
Benjamin G. Faust
By Louis Baggli
his Attorneys

UNITED STATES PATENT OFFICE.

BENJAMIN G. FAUST, OF UNITY, OREGON.

HEN'S NEST.

1,329,963. Specification of Letters Patent. Patented Feb. 3, 1920.

Application filed July 21, 1919. Serial No. 312,324.

*To all whom it may concern:*

Be it known that I, BENJAMIN G. FAUST, a citizen of the United States, residing at Unity, in the county of Baker and State of Oregon, have invented certain new and useful Improvements in Hens' Nests, of which the following is a specification.

My invention relates to an improvement in hens' nests and there are several objects, one of which is to provide a thoroughly sanitary nest. Another is to provide a nest, in which the straw or material of which it is made may be easily and quickly removed and renewed. Still another object is to provide a nest which will prevent the eggs from being soiled. Another object is to provide a nest which will prevent hens, dogs and other animals from eating the eggs. Another object is to prevent the eggs from being spoiled my setting hens, and still another object is to prevent the eggs from being broken by overcrowding of the nest.

With these several objects in view, this nest comprises two reticulated members, adapted to fit one within the other, and having an interposed body of fibrous material, such as straw, hay, excelsior, hair or the like.

My invention also consists in two main interfitting reticulated members, having a hole at the center through which the egg is adapted to drop and between which two members a fibrous material is adapted to be clamped when they are together, a means adapted to catch and receive the egg.

This invention further consists in two interfitting reticulated members having a hole in the center, in combination with a box which receives the same, and a drawer removably connected with the box located at the bottom thereof to receive the egg, and by means of which it is easily removed.

In the accompanying drawings

Figure 1:
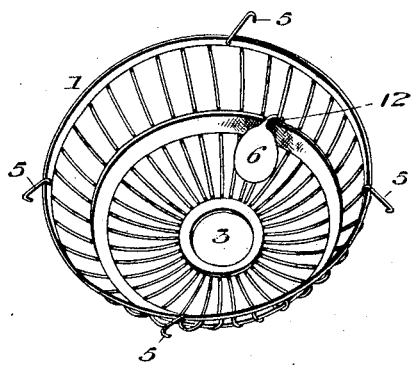
Figure 1, is a view in perspective of one of the reticulated members of the nest.
Figure 2:
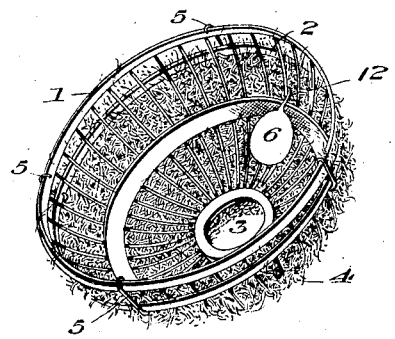
Fig. 2, is a view showing the two reticulated members nested together, with the fibrous material therebetween.
Figure 3:
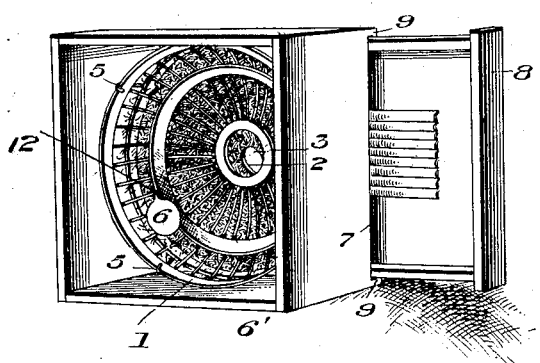
Fig. 3, is a perspective looking down upon the nest and the box of the completed nest with the drawer partly removed.
Figure 4:
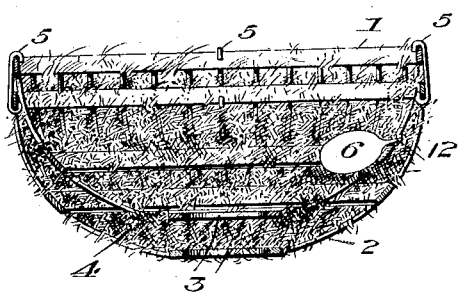
Fig. 4, is a vertical section through the completed nest.

The nest comprises in the main two baskets, 1 and 2.

These are of similar construction except that one is of slightly less diameter than the other at the top. These baskets are of reticulated formation and woven of any suitable material such as iron, hoop iron, reeds, sea grass or other like material in the general shape of a wash pan, preferably about 12 inches in diameter at the top and say 5 inches in depth with a hole 3, in the center of the bottom about 2 inches in diameter.

Excelsior, hay, grass or similar material 4, is placed in the larger basket 1, about one-half inch in thickness but so that it will not cover the hole formed in the bottom. Then the other basket 2, is placed over the fibrous material and the two are clamped together by means of the hooks 5. A decoy nest egg 6, may be fastened in place so that it will lie near the bottom of the nest. The decoy egg is preferably made of glass blown with an eyelet 12, in one end whereby a string or chain may be inserted to fasten it to the nest. When thus constructed the basket portion of the nest is inserted in a square box 6', just large enough to receive it and preferably about a foot in depth. This has a cut-away portion 7, at the lower portion of one side to receive a drawer 8, adapted to slide in and out on the cleats 9, and this drawer has a pad 10, at the center of corrugated paste board or other soft material upon which the egg is caught when it drops out of the hole through the center of the basket after which the drawer is pulled out and the egg is removed.

In this way the egg is kept clean and carefully preserved from hens, dogs or other animals, as well as setting hens and breaking of the egg is avoided by overcrowding of the nest as it always finds its way down through the hole in the bottom of the nest into the drawer below.

I claim,

1. A hen's nest comprising two nestable reticulated baskets interfitted and clamped together with fibrous material therebetween.

2. A hen's nest comprising two nestable reticulated baskets interfitted and clamped together with fibrous material therebetween, said baskets having registering holes in the bottom.

3. A hen's nest comprising two similarly formed nestable baskets, adapted to receive and clamp a fibrous material therebetween, and means for fastening said baskets together.

4. A hen's nest comprising two correspondingly formed reticulated baskets, having a hole in the center, one adapted to fit and be secured in the other and a fibrous material clamped therebetween.

5. The combination with a box having a removable bottom, of a nest made of two correspondingly shaped reticulated baskets with a fibrous material clamped therebetween, said baskets adapted to be held within the box and having an opening at the bottom through which the egg drops into the removable bottom.

In testimony whereof I affix my signature.

BENJAMIN G. FAUST.